(12) United States Patent
Cayer

(10) Patent No.: US 7,400,457 B1
(45) Date of Patent: Jul. 15, 2008

(54) RECTANGULAR FLAT-TOP BEAM SHAPER

(75) Inventor: Francis Cayer, Saint-Eustache (CA)

(73) Assignee: Stockeryale Canada Inc., Dollard-des-Ormeaux, Quebec (CA)

( * ) Notice: Subject to any disclaimer, the term of this patent is extended or adjusted under 35 U.S.C. 154(b) by 71 days.

(21) Appl. No.: 11/649,223

(22) Filed: Jan. 4, 2007

(51) Int. Cl.
*G02B 3/02* (2006.01)
*G02B 13/18* (2006.01)

(52) U.S. Cl. .................................. 359/717; 359/709
(58) Field of Classification Search ................ 359/565, 359/566, 571, 668, 708, 709, 710, 717
See application file for complete search history.

(56) References Cited

U.S. PATENT DOCUMENTS

| | | | |
|---|---|---|---|
| 4,826,299 A | | 5/1989 | Powell |
| 5,293,269 A | * | 3/1994 | Burkhart et al. ............. 359/719 |
| 6,016,227 A | * | 1/2000 | Hopkins et al. ............. 359/668 |
| 6,295,168 B1 | * | 9/2001 | Hoffnagle et al. ........... 359/708 |
| 6,654,183 B2 | * | 11/2003 | Coufal et al. ................ 359/717 |
| 6,943,964 B1 | | 9/2005 | Zhang et al. |

OTHER PUBLICATIONS

"Refractive Beam Shaper—Flat-Top2 Generator", StockerYale, Inc., May 2006, <http://www.stockeryale.com/i/lasers/products/flat-top.htm>.
"StockerYale Introduces the Flat-Top2 Generator", Salem, N.H. (Business Wire), Jul. 6, 2006, StockerYale, Inc., <http://www.stockeryale.com/company/news/pr_07062006.htm>.

* cited by examiner

*Primary Examiner*—David N Spector
(74) *Attorney, Agent, or Firm*—Ogilvy Renault, LLP

(57) ABSTRACT

The invention relates to a beam shaping system for providing a square or rectangular laser beam having a controlled intensity profile (uniform, super gaussian or cosine corrected for example) from an incident non-uniform beam intensity profile laser beam source (a Gaussian profile, a profile with astigmatism or any non-rotationally symmetric and non-uniform profile for example). The beam shaping system uses a first acylindrical lens for shaping the incident laser beam along a first axis and a second acylindrical lens orthogonally disposed relative to the first acylindrical lens and for shaping the incident beam along a second axis. The thereby provided light beam is a rectangular beam having a controlled intensity distribution in the far field.

36 Claims, 11 Drawing Sheets

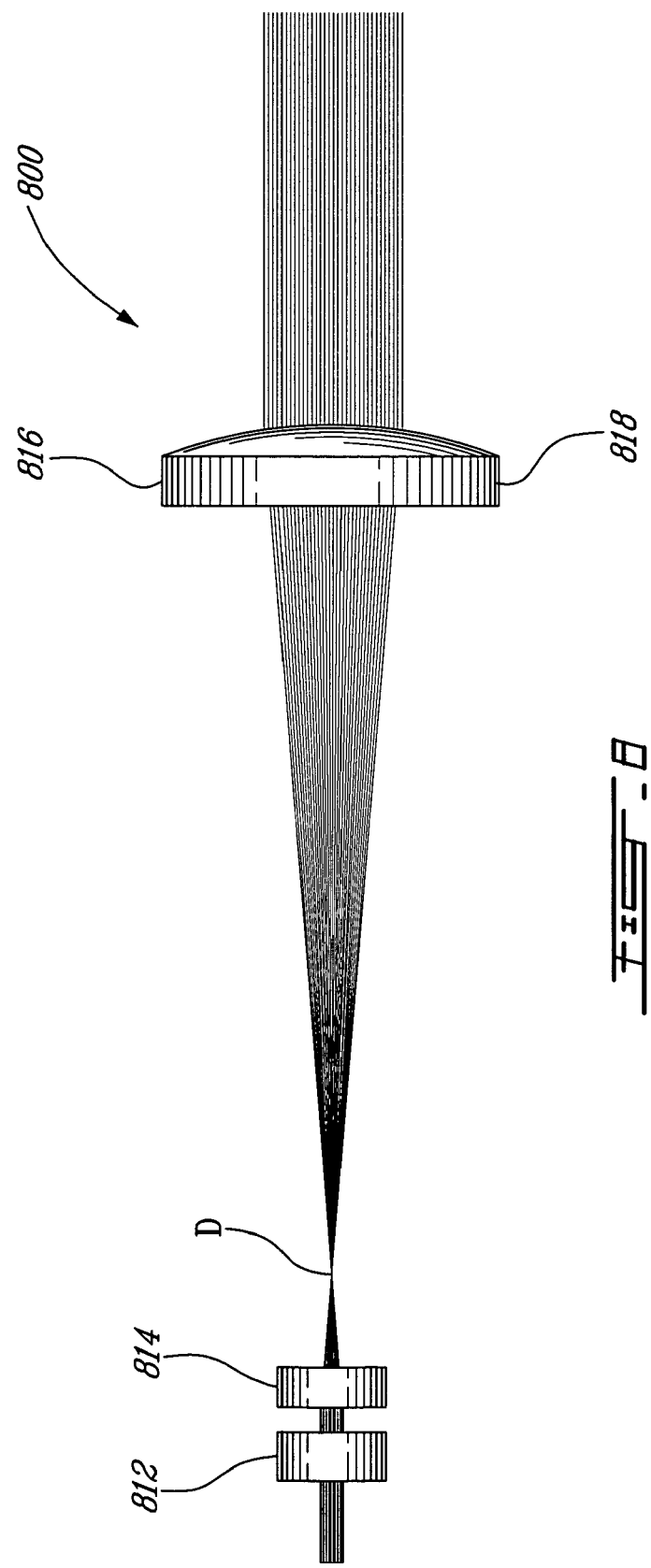

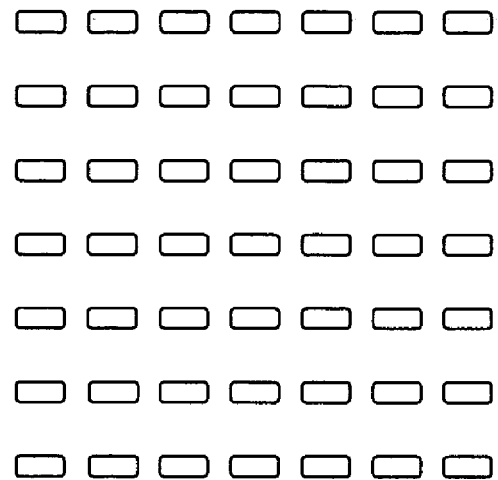
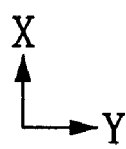
FIG. 11
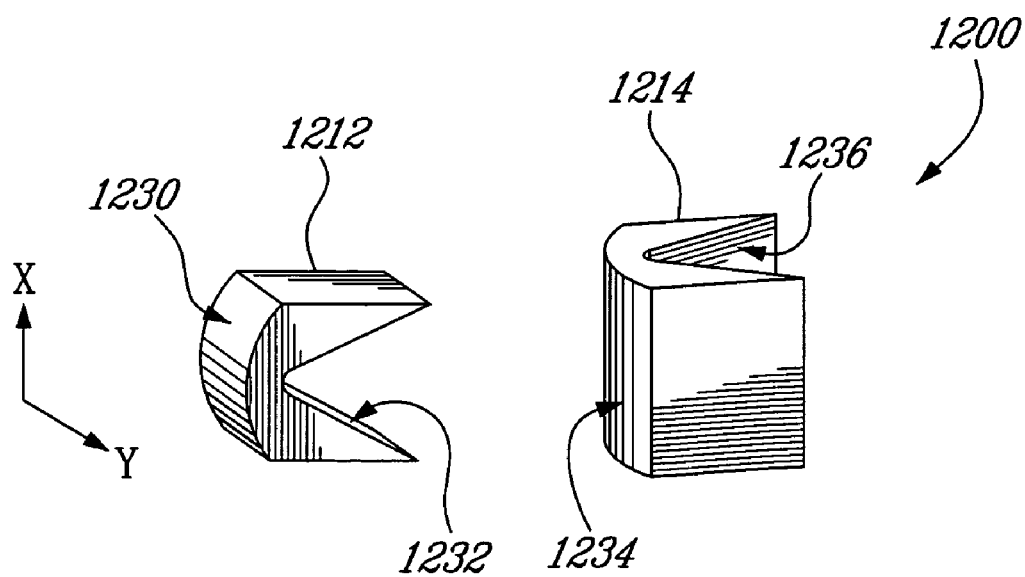
FIG. 12

RECTANGULAR FLAT-TOP BEAM SHAPER

BACKGROUND OF THE INVENTION

1) Field of the Invention

The invention relates to laser beam shaping. More particularly, the invention relates to a beam shaping system for providing a square or rectangular laser beam with controlled intensity distribution.

2) Description of the Prior Art

While most laser sources and more precisely laser diodes sources produce an astigmatic beam of light having a substantially non-uniform intensity profile, numerous laser applications require a uniform illumination of a rectangular target. Such applications include biomedical applications, such as bio-detection, wherein, for example, a uniform illumination of a blood sample is required. Other applications include micromachining, microscopy, night vision and range finding of distant object.

Shaping a Gaussian-like laser beam using diffractive optics can provide a flat-top laser beam. One drawback of diffractive beam shapers is the wavelength dependency of their optical response. Another drawback is the low efficiency. Diffractive beam shapers are thus not suitable for wide spectrum or multiple wavelength illumination.

Refractive beam shaping techniques are efficient and provide low wavelength dependency. Conventional refractive techniques using aspherical lenses are suitable for generating a rotationally symmetrical flat-top beam from a rotationally symmetrical Gaussian input beam, but they are not adapted to shape an incident beam that is not rotationally symmetrical, like laser diode beams. Laser diodes have an elliptical intensity profile and suffer from astigmatism.

U.S. Pat. No. 4,826,299 to Powell, provides a lens for expanding a laser beam along one axis in order to provide a laser line of uniform intensity and width. Such a diverging lens has an acylindrical surface defined by a base curve in the shape of an angle with a rounded apex. The radius of curvature of the acylindrical surface is thus smaller in the center and increases smoothly towards both ends. As described in Powell, the acylindrical surface fits to a base curve defined in a Cartesian coordinate system (x,y,z) by the following equation:

$$y = \frac{cx^2}{1 + (1 - (1+Q)c^2 x^2)^{1/2}}$$

wherein c is a curvature constant and Q is a conic constant, and wherein the product Q.c lies between 0.25 and 50 mm$^{-1}$ and Q is less than −1. The second surface of the acylindrical lens may either be flat or cylindrical.

Acylindrical lenses have been created and used in the prior art for providing a laser line of uniform intensity. Laser lines are used, for example, for alignment purposes. The provided laser line should then be long and thin. Acylindrical lenses described in Powell provides a high divergence to provide the required line length.

SUMMARY OF THE INVENTION

The invention relates to a beam shaping system for providing a square or rectangular laser beam having a controlled intensity profile (uniform, super gaussian or cosine corrected for example) from an incident non-uniform beam intensity profile laser beam source (a Gaussian profile, a profile with astigmatism or any non-rotationally symmetric and non-uniform profile). The beam shaping system uses a first acylindrical lens for shaping the incident laser beam along a first axis and a second acylindrical lens orthogonally disposed relative to the first acylindrical lens and for shaping the incident beam along a second axis. The thereby provided light beam is a rectangular beam having a controlled intensity distribution in the far field.

This light beam may be collimated using a collimating lens system for maintaining its intensity profile and size over a significant distance and maintain the controlled intensity profile (i.e. flat-top, cosine corrected, etc.).

Alternatively, the light beam may be focused for an efficient illumination of a typically submillimeter dimensioned target with a controlled intensity distribution at the Fourier plane of the focusing lens.

Furthermore, a diffractive or refractive beam splitter, a micro lenses array for example, may be used to generate a multiple rectangular flat-top pattern arranged in a row or in a two-dimensional array.

The present invention provides a way to independently shape the intensity profile of a light beam along two mutually independent and perpendicular axis. Suppose a normal Cartesian coordinates system X,Y and Z, Z being the propagation axis of the light beam. The present invention can be used to provide, for example, a laser beam with a flat top intensity distribution along the X axis and a cosine fourth corrected intensity distribution along the Y axis.

One aspect of the invention provides a beam shaping system for providing a shaped beam substantially rectangular and having a controlled intensity profile in a far field region, from an incident beam having a predetermined intensity profile along a first and a second axis. The beam shaping system comprising a first and a second acylindrical lens each having a primary acylindrical surface with a base curve. The first and the second acylindrical lenses are disposed substantially orthogonally to one another. The first acylindrical lens is for shaping the incident beam along the first axis and the second acylindrical lens is for shaping the incident beam along the second axis, thereby providing the substantially rectangular shaped beam. The base curve of the first lens fits a first equation in a Cartesian coordinate system (x,y), the first equation being $$y = \frac{c_1 x^2}{1 + (1 - (1+Q_1)c_1^2 x^2)^{1/2}} + f_1(x),$$

c1 being a first curvature constant, Q1 being a first conic constant and $f_1(x)$ being a first correction function, the first correction function being continuous. The base curve of the second lens fits a second equation in another Cartesian coordinate system (x,y), the second equation being $$y = \frac{c_2 x^2}{1 + (1 - (1+Q_2)c_2^2 x^2)^{1/2}} + f_2(x),$$

c2 being a second curvature constant and Q2 being a second conic constant and $f_2(x)$ being a second correction function, the second correction function being continuous.

Another aspect of the invention provides a rectangular beam light source for providing a substantially rectangular shaped beam having a controlled intensity profile. The rectangular beam light source comprises an incident light source for providing an incident beam having a predetermined cross-sectional intensity profile along a first axis and a second axis, and a first and a second acylindrical lens each having a primary acylindrical surface with a base curve. The first and the second acylindrical lenses being disposed substantially orthogonally to one another. The first acylindrical lens is for shaping the incident beam along the first axis and the second acylindrical lens is for shaping the incident beam along the second axis, thereby providing the substantially rectangular shaped beam. The base curve of the first lens fits a first equation in a Cartesian coordinate system (x,y). The first equation being $$y = \frac{c_1 x^2}{1 + (1 - (1 + Q_1)c_1^2 x^2)^{1/2}} + f_1(x),$$

c: being a first curvature constant, $Q_1$ being a first conic constant and $f_1(x)$ being a first correction function, the first correction function being continuous. The base curve of the second lens fits a second equation in another Cartesian coordinate system (x,y). The second equation being $$y = \frac{c_2 x^2}{1 + (1 - (1 + Q_2)c_2^2 x^2)^{1/2}} + f_2(x),$$

$c_2$ being a second curvature constant and $Q_2$ being a second conic constant and $f_2(x)$ being a second correction function, the second correction function being continuous.

Yet another aspect of the invention provides a beam shaping system for providing a substantially rectangular beam having a controlled intensity profile from an incident beam having a predetermined intensity profile along a first axis and a second axis. The beam shaping system comprises a first and a second acylindrical lens each having a primary acylindrical surface having a base curve substantially in the shape of an angle with a rounded apex. The first lens is for shaping the incident beam along the first axis and the second lens is for shaping the incident beam along the second axis. The first and the second acylindrical lenses are disposed substantially orthogonally to one another, thereby providing the substantially rectangular shaped beam in a far field region.

Still another aspect of the invention provides a beam shaping system for providing a substantially rectangular beam having a controlled intensity profile from an incident beam having a predetermined intensity profile along a first axis and a second axis. The beam shaping system comprises a first and a second lens each having a primary acylindrical surface having a base curve with a radius of curvature that varies along the base curve. The radius of curvature is smaller in a center of the base curve and increases smoothly towards both of extremities of the base curve. The first lens and the second lens are disposed orthogonally to one another. The first lens is for shaping the incident beam along the first axis and the second lens is for shaping the incident beam along the second axis, thereby providing the substantially rectangular beam in a far field region.

In this specification, the term "acylindrical surface" is intended to mean a surface generated by a straight line which moves so that it always intersects a given plane curve called the base curve, and remains normal to the plane of the base curve, the base curve not consisting of a segment of a circle. A "cylindrical surface" is intended to mean a surface as defined above but the base curve consisting of a segment of a circle.

BRIEF DESCRIPTION OF THE DRAWINGS

Further features and advantages of the present invention will become apparent from the following detailed description, taken in combination with the appended drawings, in which:

FIG. 8 is a schematic representation of a rectangular beam shaping system using two orthogonally disposed acylindrical lenses along with a single rotationally symmetrical collimating lens;

FIG. 11 is a graph illustrating a rectangular beam array obtained using the beam shaping system of FIG. 10; and FIG. 12 is a schematic representation of a rectangular beam shaping system comprising two orthogonally disposed negative acylindrical lenses.

It will be noted that throughout the appended drawings, like features are identified by like reference numerals.

DETAILED DESCRIPTION

Figure 1:
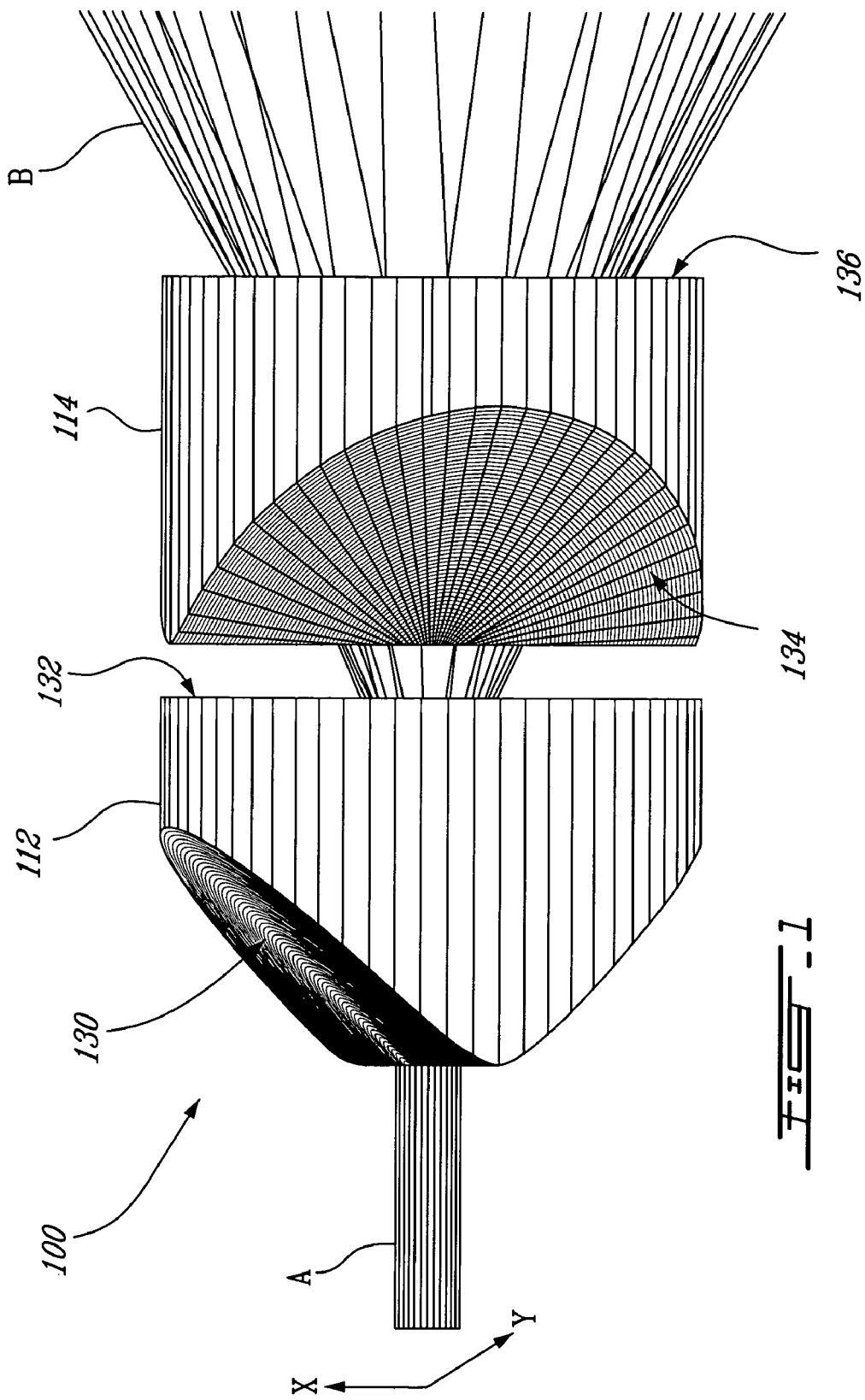
FIG. 1 is a schematic representation of a rectangular beam shaping system comprising two orthogonally disposed positive acylindrical lenses.

Now referring to the drawings, FIG. 1 illustrates a beam shaping system 100 for providing a square or rectangular laser beam B having a controlled intensity profile from an incident laser beam A having a predetermined non-uniform intensity profile. The beam shaping system uses two orthogonally disposed acylindrical lenses 112,114, the first acylindrical lens 112 for shaping the incident beam A along the X-axis and the second acylindrical lens 114 for shaping the incident beam A along the Y-axis. It is noted that the curvature of the acylindrical surfaces 130 and 134 are exaggerated in FIG. 1 for the purpose of illustration.

Since the beam shaping system 100 includes a different acylindrical shaping lens 112,114 for each orthogonal axis, the two orthogonal axes of the intensity profile are shaped independently.

In this embodiment, the incident laser beam A is an elliptical beam (see FIGS. 2A and 2B), but in alternative embodiments, the incident laser beam A has a rotationally symmetric Gaussian profile, a profile with astigmatism or any non-rotationally symmetric and non-uniform profile. Also in this embodiment, the two crossed acylindrical lenses 112,114 are adapted to provide a resulting rectangular laser beam B having a flat-top profile along the X-axis and a cosine corrected profile along the Y-axis in the far field. In alternative embodiments, the two orthogonally disposed acylindrical lenses 112, 114 have different shapes for providing a uniform, a super Gaussian, a cosine corrected or any other controlled intensity profile on each of the X- and Y-axes.

The first and the second acylindrical lenses 112,114 are a positive lenses. The input surface 130 of the first acylindrical lens 112 is a convex acylindrical surface having a variable radius of curvature along the X-axis. The radius of curvature is smaller in the center of the surface and increases smoothly toward both X-extremities of the lens. It results in a greater divergence in the center of the lens which spreads out the beam in the center while containing it on the edges. The optical intensity is thus spatially redistributed and, when the curvature and the conic constants are suitably adapted to the incident beam intensity profile, it provides a controlled intensity distribution along the X-axis. The first acylindrical lens 112 expends the incident beam A along the X-axis to provide a diverging beam intensity profile along the X-axis. At the output of the first acylindrical lens 112, the beam intensity profile remains substantially unchanged along the Y-axis. The output surface 132 of the first acylindrical lens 112 is a planar surface. Alternatively, the output surface 132 could by a cylindrical surface diverging (or converging) along the X-axis for reducing or increasing the optical power of the lens.

The second acylindrical lens 114 is orthogonally disposed relative to the first acylindrical lens 112 in order to shape the incident beam intensity profile along the Y-axis. The second acylindrical lens 114 is similar to the first acylindrical lens 112 but the exact shape of the input 130,134 and output 132,136 surfaces of the first 112 and the second lens 114 are independently selected as a function of the X and Y-profiles of the incident beam A and of the required intensity profile of the resulting rectangular beam B.

The two acylindrical lenses 112,114 substantially fits to a base curve defined in a Cartesian coordinate system (x,y,z) by the following equation:

$$y = \frac{cx^2}{1 + (1 - (1+Q)c^2x^2)^{1/2}},$$

wherein c is a curvature constant and Q is a conic constant.

A continuous correction function f(x) can be added, the correction function being defined by $$f(x) = \sum_i a_i x^i,$$

wherein $a_i$ are small value constants for small added corrections.

Typically, the acylindrical lenses 112,114 are made of glass with an index of refraction lying between 1.4 and 2, but other transparent materials such as polycarbonate and silicones can alternatively be used. In this embodiment, the first acylindrical lens 112 is made of Bk7 glass by Schott™ and has a divergence of mrad, a curvature constant $c_1$ of 0.0118 and a conic constant $Q_1$ of −25000, and the second acylindrical lens 114 is also made of Bk7 glass but has a divergence of 17 mrad, a curvature constant $c_2$ of 0.0250 and a conic constant $Q_2$ of −2500.

It is noted that, alternatively, the acylindrical surface of one or both acylindrical lenses could be a concave surface, thereby providing a negative lens instead of a positive lens. Furthermore, in the embodiment of FIG. 1, the acylindrical surface is the input surface of the acylindrical lenses but the acylindrical surface could alternatively be provided as the output surface of the acylindrical lenses.

It is noted that, according to simulations, an appropriate absolute value of the product Q.c lies between about 0.25 and 1000 $mm^{-1}$ and that Q should be less than −1.

Figure 2A:
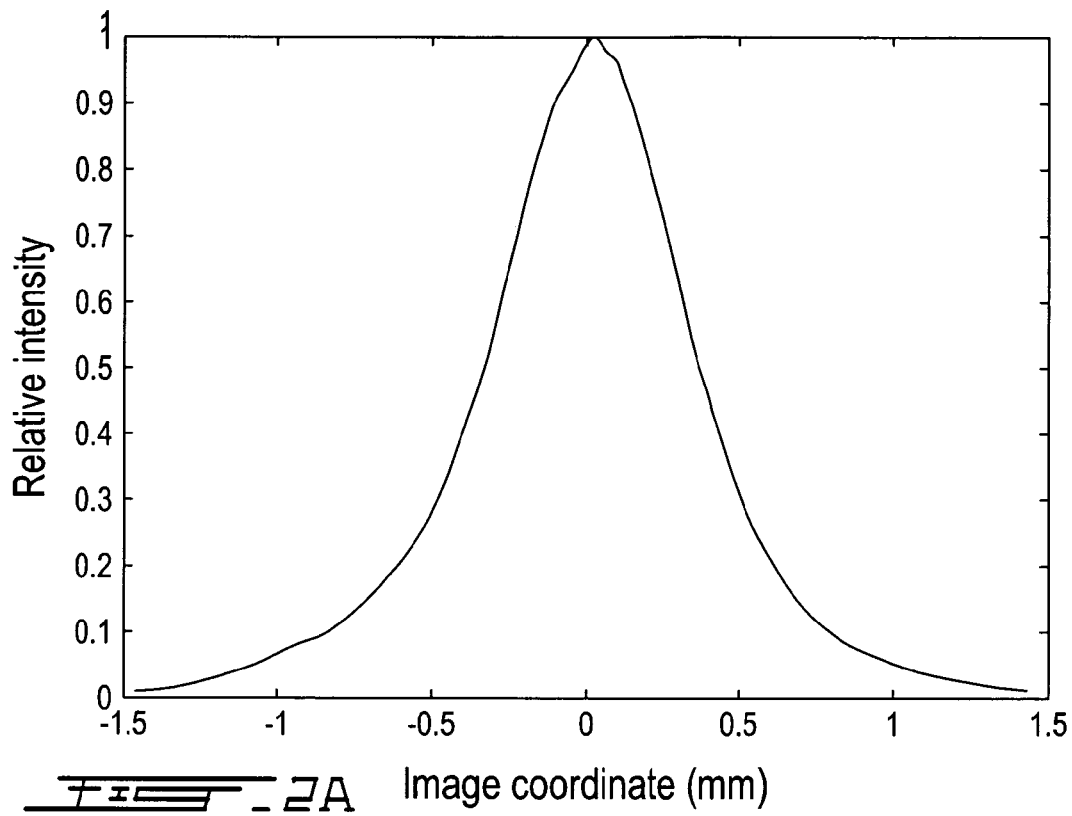
FIGS. 2A and 2B are graphs showing an incident laser beam intensity profile along the X-axis and the Y-axis respectively.
Figure 2B:
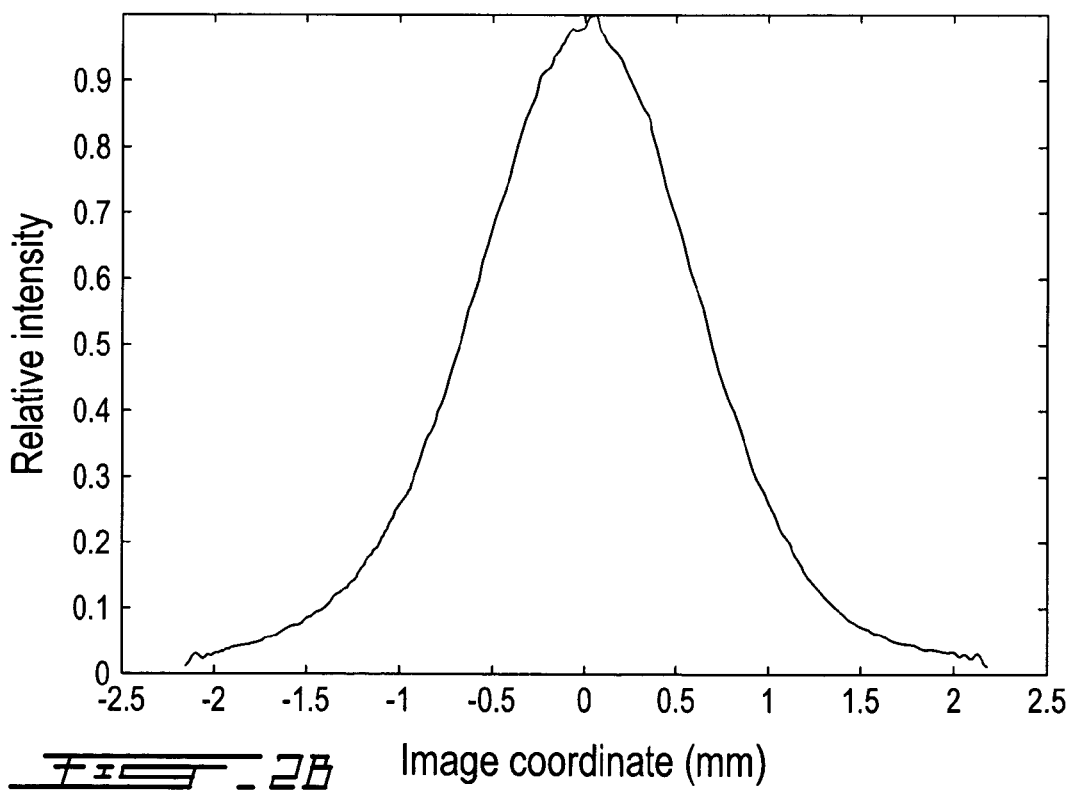

FIGS. 2A and 2B illustrate the intensity profile, along the X-axis and the Y-axis respectively, of the incident laser beam A of FIG. 1. The laser source is a laser diode source providing a laser beam of 100 mW of power with a wavelength of 660 nm, used in pair with an aspheric collimator with a focal length of 4.5 mm. The aspherical collimator collimates the incoming beam from the laser diode source. The collimated beam, i.e. the incident beam A, has a substantially elliptical shape in the plane normal to the propagation (the X-Y plane). The size of the short (X) and the long (Y) axes of the ellipse at 13.5% ($1/e^2$) of the relative intensity profile is of 1.4×2.6 mm. The intensity profile substantially fits a gauss-lorentzian shape along the X-axis and a gaussian shape along the Y-axis.

It is noted that the incident laser beam source could alternatively be any mono-mode or multi-mode laser source with a wavelength from about 275 to 1600 µm, such as an argon laser, an excimer laser or a tunable laser source. In some specific applications, it is required that the target be quite uniformly illuminated with a laser light comprising two or more wavelength components. The two or more wavelength components can be provided by combining two or more laser source beams and providing the combined incident laser beam to the beam shaping system 100. The beam shaping system 100 having low wavelength dependency, it is adapted to similarly shape the various wavelength components.

Figure 3A:
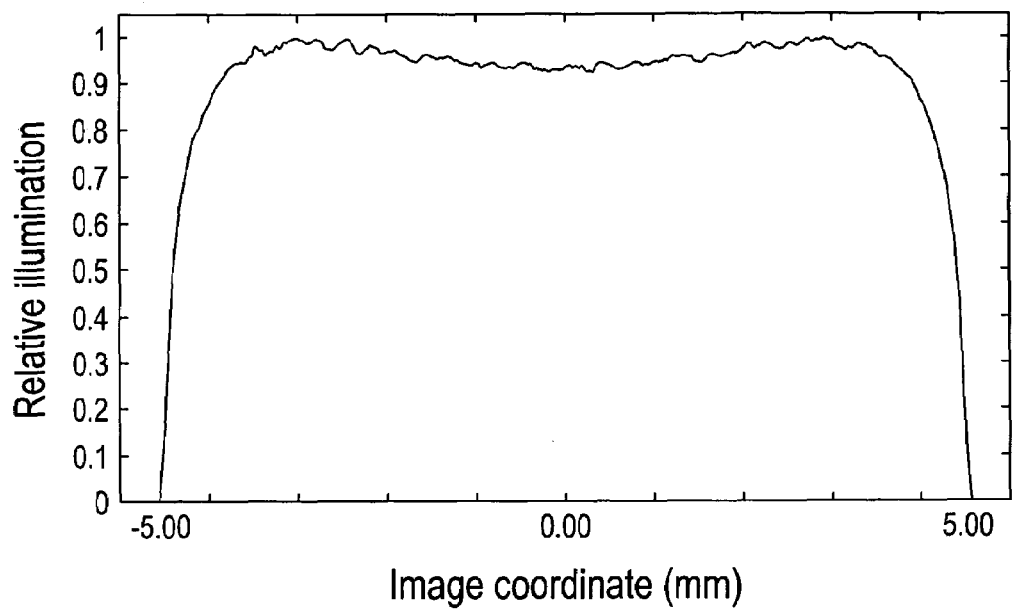
FIGS. 3A and 3B are graphs showing a rectangular beam intensity profile in the far field and obtained using the beam shaping system of FIG. 1 and along the X-axis and the Y-axis respectively.
Figure 3B:
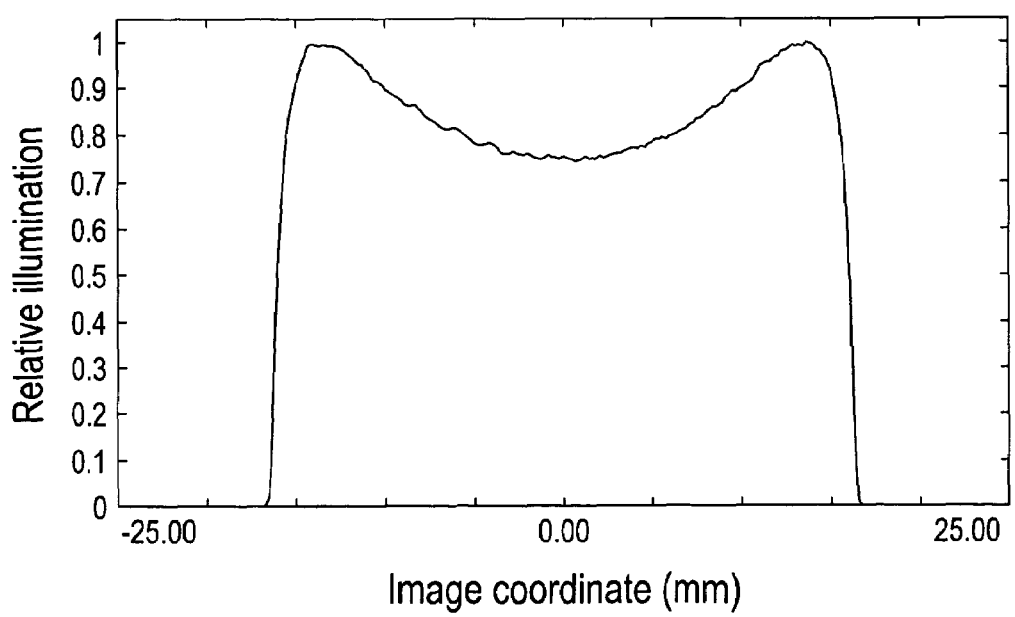

FIGS. 3A and 3B show the intensity profile in the far field of the rectangular beam B obtained by numerical simulations, using the beam shaping system 100 of FIG. 1 and the incident laser beam A illustrated in FIGS. 2A and 2B. FIGS. 3A and 3B shows the intensity profile along the X- and Y-axis respectively.

The far field is defined as the distance where the intensity profile is completely formed, i.e. where z>>φ/FA, wherein φ is the input beam diameter and FA the fan angle. This condition needs to be respected in order to have a completely formed pattern. In this case, FA=5 mrad and φ=1.4 mm for the first acylindrical lens 112 and FA=17 mrad and φ=2.6 mm. Accordingly, the far field is defined by a distance z>>300 mm.

FIG. 3A and FIG. 3B show the intensity profile at a distance of 2000 mm in front of the beam shaping system 100. The resulting intensity profile fits a super Gaussian profile along the X-axis (FIG. 3A) and a cosine fourth corrected profile along the Y-axis (FIG. 3B). The cosine fourth corrected profile is of particular interest for compensating the fall off of the intensity profile when observed with a camera, according the known cosine fourth law.

Figure 4A:
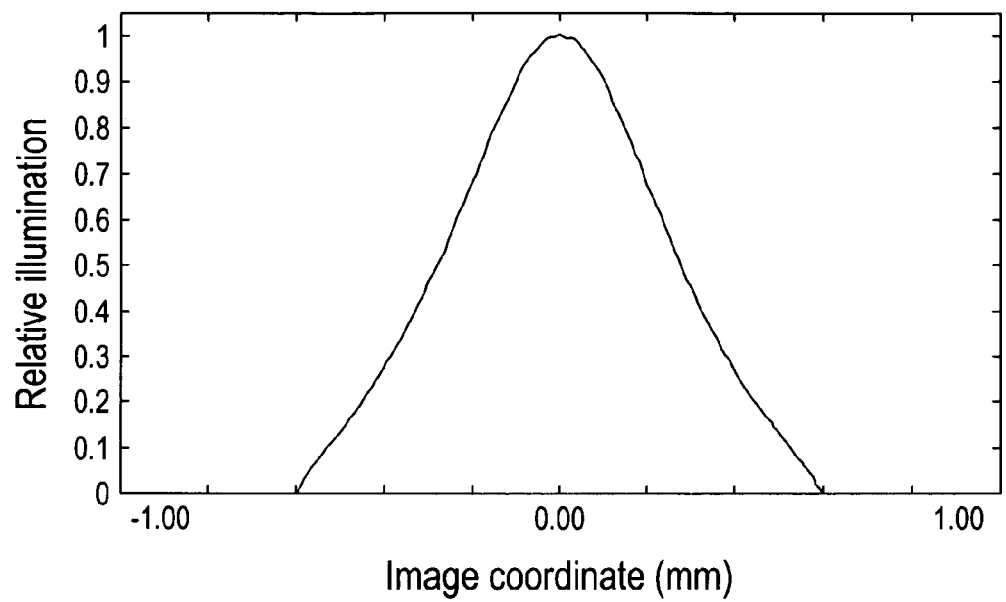
FIGS. 4A, 4B and 4C are graphs showing the rectangular beam intensity profile obtained using the beam shaping system of FIG. 1, in the near field and along the X-axis, wherein FIGS. 4A, 4B and 4C respectively correspond to the intensity profile at a distance of 30, 500 and 700 mm in front of the beam shaping system.
Figure 4B:
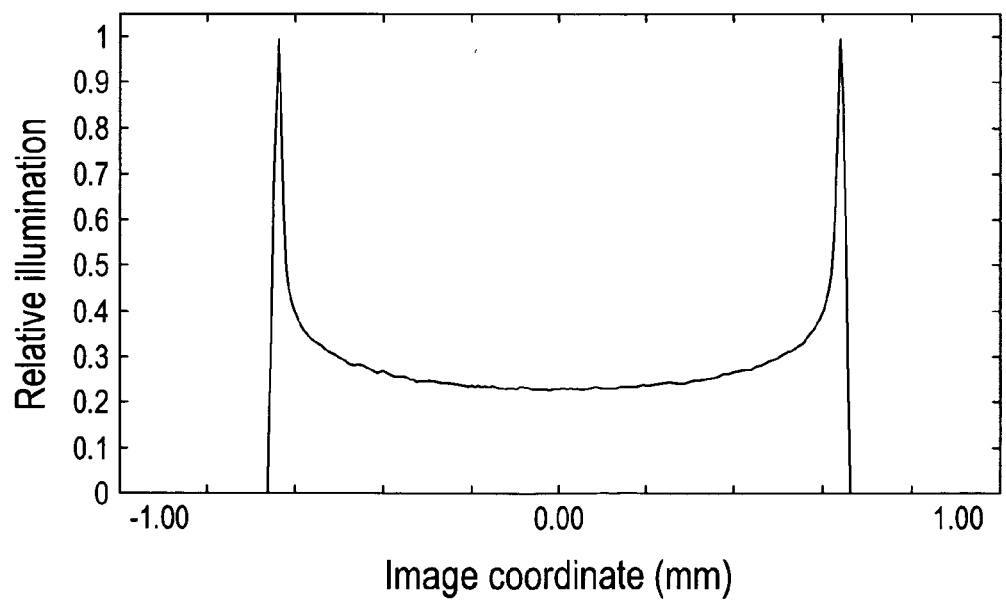
Figure 4C:
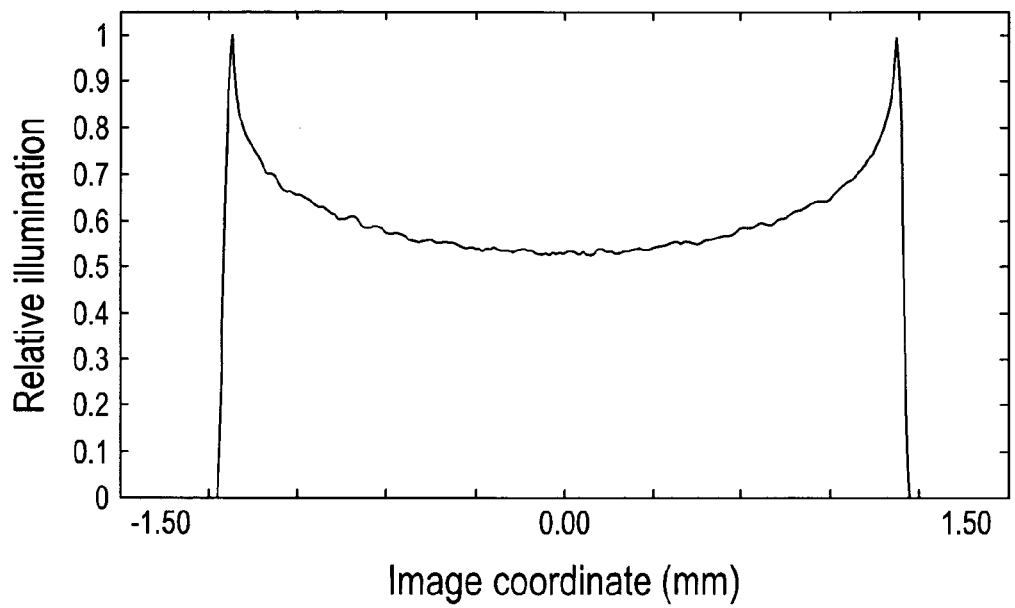

FIGS. 4A, 4B and 4C show the rectangular beam B intensity profile obtained using the beam shaping system of FIG. 1, in the near field and along the X-axis. FIGS. 4A, 4B and 4C respectively correspond to the intensity profile at a distance of 30, 500 and 700 mm in front of the beam shaping system 100.

Figure 5:
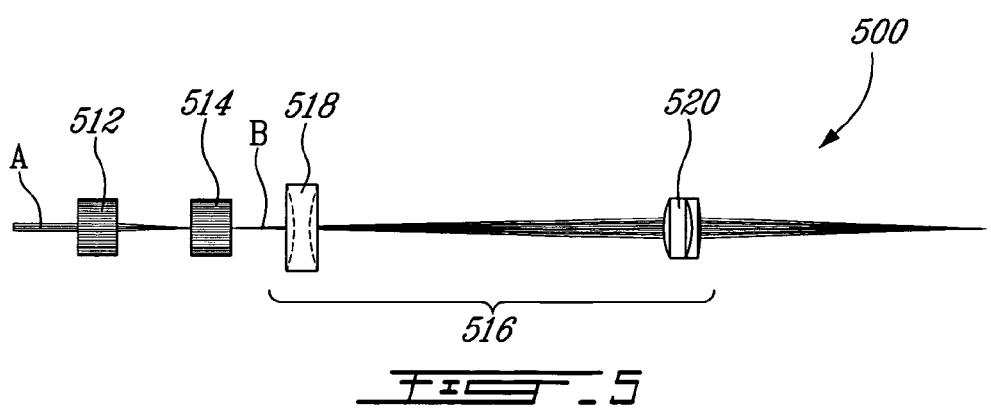
FIG. 5 is a schematic representation of a rectangular beam shaping system using two orthogonally disposed acylindrical lenses along with a retro-focus rotationally symmetrical focusing lens system.

FIG. 5 illustrates a beam shaping system 500 using the pair of crossed acylindrical lenses 512,514 along with retro-focus rotationally symmetrical focusing lens system 516. Thanks to the focusing lens system 516, the rectangular laser beam B can be used to illuminate a target in the near field. A typical target being of submillimeter dimensions, the beam needs to be focused into a submillimeter rectangle for an efficient uniform illumination of the target. The beam shaping system 500 thus comprise two orthogonally disposed acylindrical lenses 512,514 similar to the acylindrical lenses 112,114 of the system 100 of FIG. 1 and further comprise retro-focus focusing lens system 516.

A principle of optics provides that the beam intensity profile in the far field of a system is imaged at the Fourier plane (focal plane) using the focusing lens system. Using a focusing lens system with a short focal length, it is possible to produce a small rectangularly shaped beam profile in the near field with a controlled intensity profile. The size of the focused pattern is given by bs=2*f*tan(FA/2), wherein f is the focal length of the focusing lens system and FA is the divergence of the acylindrical lenses 512,514.

The retro-focus focusing lens system 516 comprise a negative (diverging) lens device 518, e.g. a double concave lens with a focal length of −18 mm, and a positive (converging) lens device 520, e.g. a positive achromatic doublet with a focal length of 20 mm. The negative lens device 518 is located between the acylindrical lenses 512,514 and the positive lens device 520. The retro-focus focusing system 516 has a total focal length of 10 mm and a working distance of 30 mm. Used in pair with the pair of crossed acylindrical lenses 512,514 respectively having a divergence of 17 mrad and 34 mrad, a 200×500 µm rectangular flat-top profile is generated. The resulting flat-top profile is illustrated in FIGS. 6A and 6B.

In order to provide low aspherical aberration, the positive lens device 520 is an achromatic doublet but any other positive lens device, such as a simple biconvex lens, could alternatively be used. Furthermore, it is contemplated that the negative lens device 518 and the positive lens device 520 may use aspheric lenses to eliminate spherical aberrations.

It is noted that, alternatively, a simple positive lens arrangement could be used as focusing lens means.

Figure 6A:
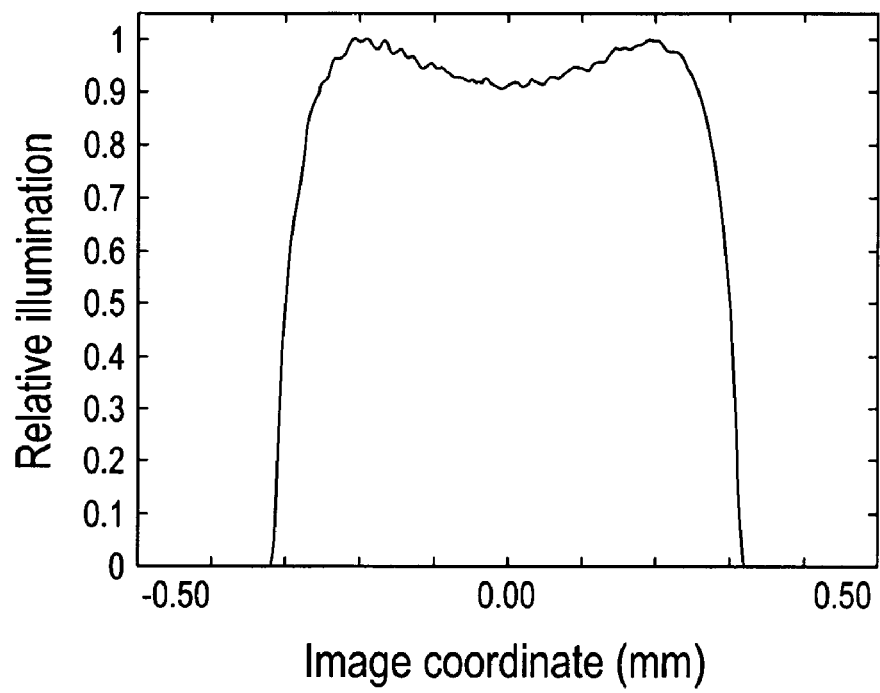
FIGS. 6A and 6B are graphs showing a rectangular beam intensity profile obtained using the beam shaping system of FIG. 5 and along the X-axis and the Y-axis respectively.
Figure 6B:
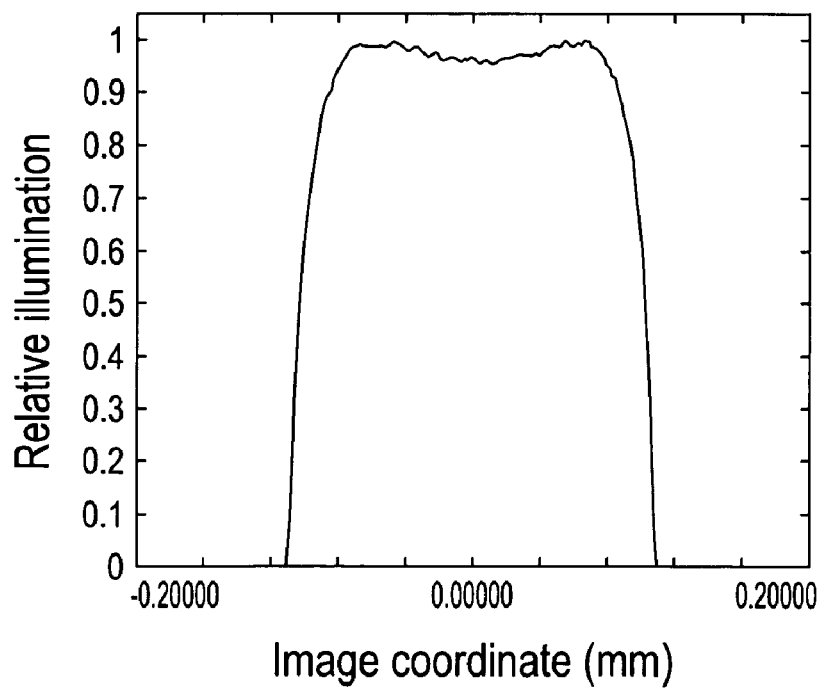

FIGS. 6A and 6B show the focused beam intensity profile obtained using the beam shaping system 500 of FIG. 5, along the X- and Y-axis respectively. The resulting profile is a substantially flat-top profile along both X- and Y-axes.

Figure 7A:
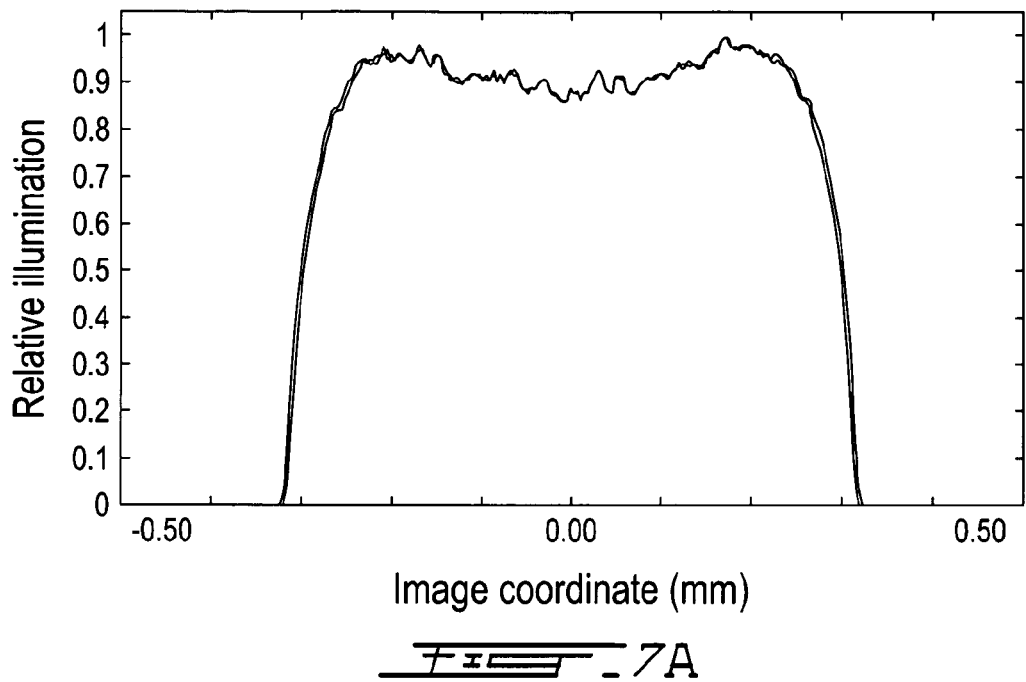
FIGS. 7A and 7B are graphs showing a rectangular beam intensity profile obtained using the beam shaping system of FIG. 5 for two different input wavelengths (superimposed on the graphs) and along the X-axis and the Y-axis respectively.
Figure 7B:
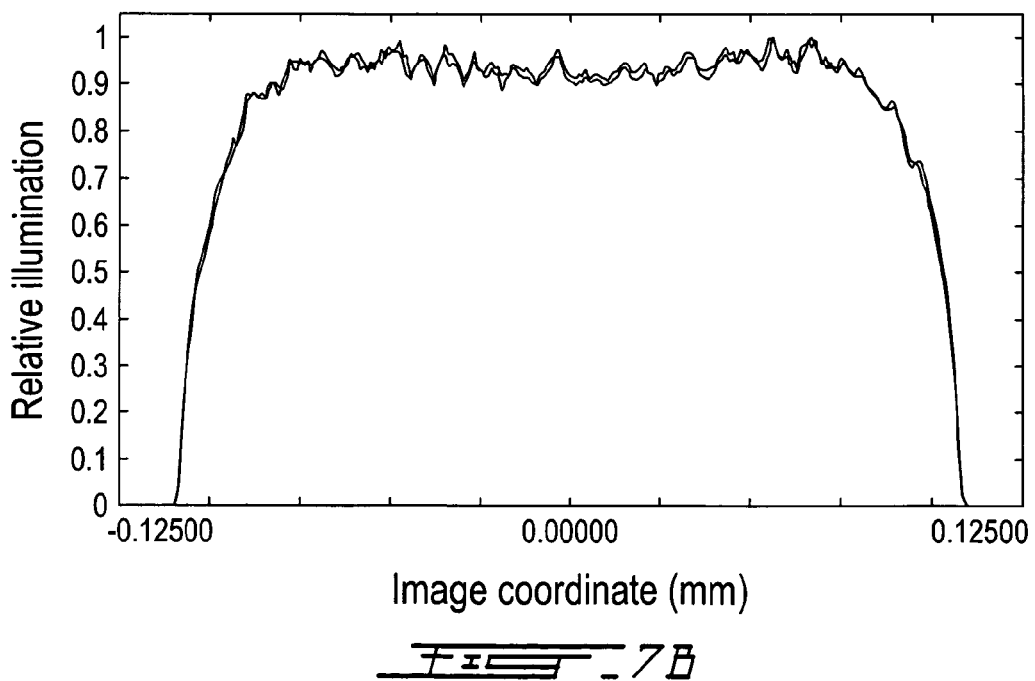

FIGS. 7A and 7B show a rectangular beam intensity profile obtained using the beam shaping system of FIG. 5 for two different input wavelengths (superimposed on the graphs) and along the X- and Y-axis respectively. Since the system based on refractive optics, it is possible to have a multiple wavelength input beam. A first laser source has a wavelength of 532 nm and second source, a wavelength of 780 nm. FIG. 7A shows the superimposition of the intensity profiles obtained along the X-axis for both wavelengths. Similarly, FIG. 7B shows the intensity profiles obtained along the Y-axis.

It is noted that, the equations defining the acylindrical surfaces are adapted to the incident beam intensity profile. In a case where two or more laser sources are combined up-front for providing more than one wavelength components, the intensity distribution should ideally be alike for each wavelength components on the incident beam. If it is not the case, the output intensity distribution corresponding to each wavelength component will differ and may deviate from the target profile. If the application does not tolerate relaxed uniformity requirements on one of the wavelength components, the beam intensity profiles of the sources may be matched up-front.

FIG. 8 illustrates a collimation-type beam shaping system 800 using two crossed acylindrical lenses 812,814 similar to the acylindrical lenses 112,144 of FIG. 1, along with collimating lens means 816. The collimating lens means 816 comprises a single rotationally symmetrical positive lens 818. The collimating lens means 816 provides a rectangular beam intensity profile and a beam size that is maintained over a significant distance. The collimating lens 818 is a rotationally symmetrical piano-convex singlet having a focal length of 30 mm and positioned at one focal length distance in front of the diverging point source D of the beam shaping system 100.

The point source D is longitudinally stretched because of the spherical aberration of the pair of crossed acylindrical lenses 812,814. However it is still possible to quasi collimate the rectangular beam provided at the output of the system 100.

Figure 9:
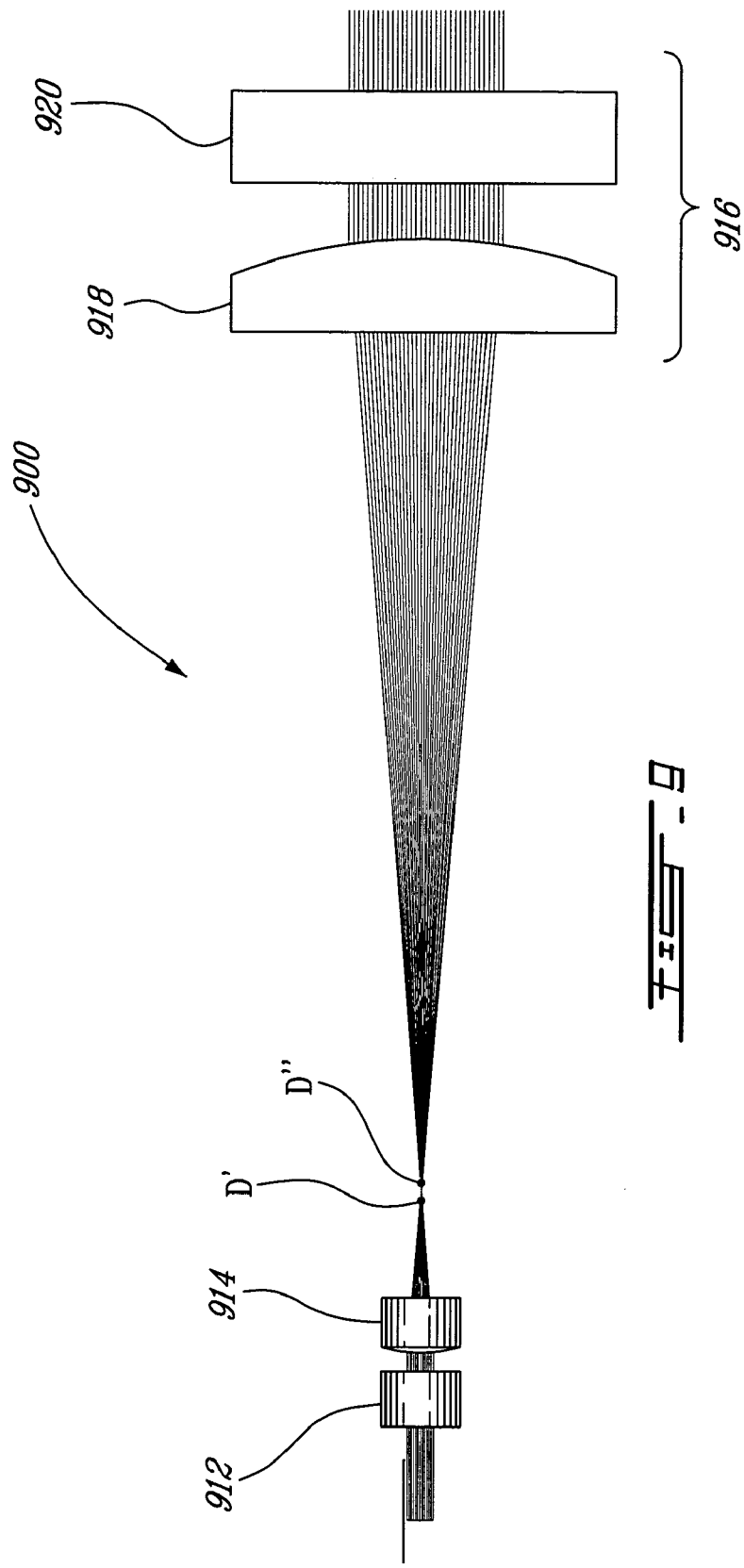
FIG. 9 is a schematic representation of a rectangular beam shaping system using two orthogonally disposed acylindrical lenses along with a collimating lens system comprising two orthogonally disposed cylindrical collimating lenses.

Since the point sources of the two crossed acylindrical lenses 812,814 are located at different positions along the propagation distance, the system has astigmatism aberration. Thus, to eliminate the astigmatism and to further improve the collimation, two orthogonally independent collimating systems could alternatively be used. FIG. 9 illustrates such beam shaping system 900. The beam shaping system 900 uses two orthogonally disposed acylindrical lenses 912,914 similar to the acylindrical lenses 112,144 of FIG. 1, along with collimating lens means 916. The collimating lens means 916 comprises two orthogonally disposed cylindrical collimating lenses 918,920. The first cylindrical collimating lens 918 is located at one focal length from the point source D' of the first acylindrical lens 912 and the second cylindrical collimating lens 920 is located at one focal length from the point source D" of the second acylindrical lens 914. Using this configuration, it is possible to achieve a collimated beam with an almost diffraction limited wavefront.

Similarly, the focusing system of FIG. 5 could also use pairs of orthogonally disposed cylindrical lenses instead of rotationally symmetrical lenses 518,520 for eliminating astigmatism.

Figure 10:
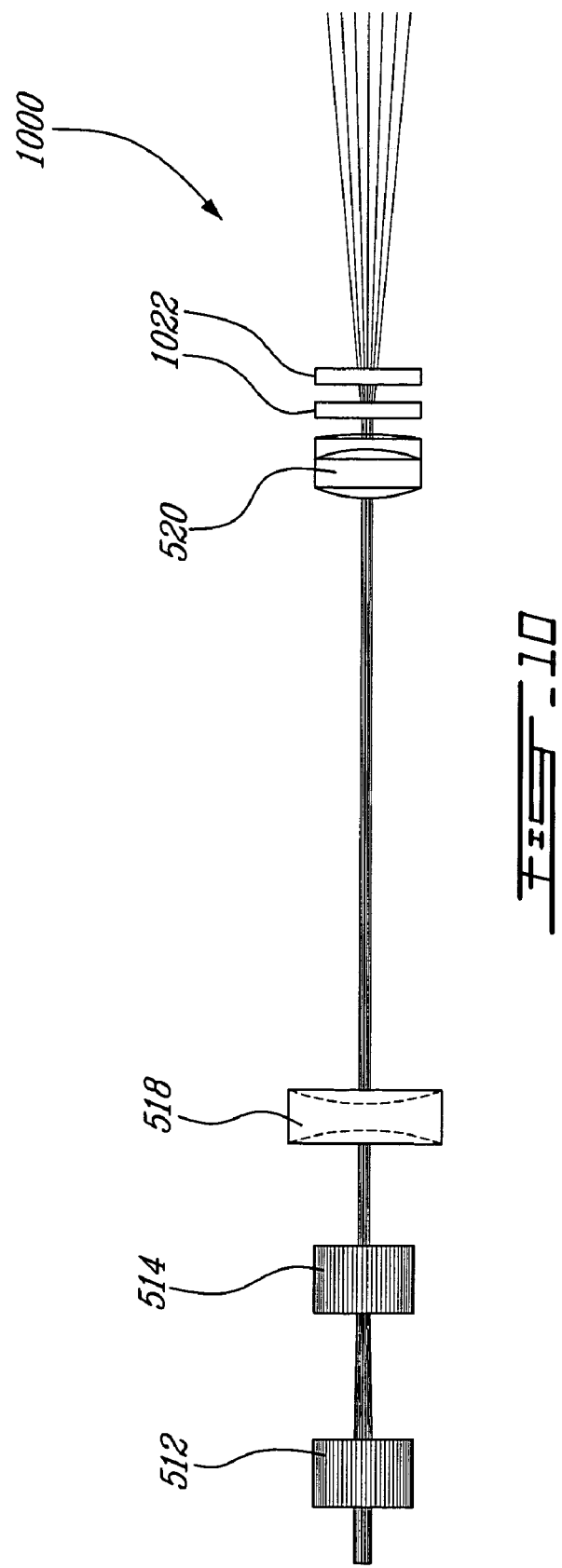
FIG. 10 is a schematic representation of a rectangular beam shaping system using the system of FIG. 5 along with a diffractive beam splitter.

FIG. 10 illustrates a rectangular beam shaping system 1000 using the beam shaping system 500 of FIG. 5 along with a diffractive beam splitter 1022 for generating an array of rectangular patterns of uniform intensity. The diffractive beam splitter 1022 is a transmission grating optimized for a wavelength of 660 nm and producing a 7×7 pattern array. Alternatively, a micro lenses array could be used to produce an array of rectangular flat-top patterns at the Fourier plan of the micro lenses array.

FIG. 11 illustrates a rectangular beam array obtained using the beam shaping system 1000 of FIG. 10.

FIG. 12 illustrates an alternative embodiment of the embodiment of FIG. 1. The beam shaping system 1200 uses two orthogonally disposed acylindrical lenses 1212,1214. The first and the second acylindrical lens 1212,1412 are negative lenses. The input surface 1230 of the first acylindrical lens 1212 is a convex cylindrical surface which provides divergence along the X-axis and the output surface 1232 is a concave acylindrical surface having a variable radius of curvature along the X-axis for shaping the incident beam along the X-axis. At the output of the first acylindrical lens 1212, the beam intensity profile remains substantially unchanged along the Y-axis. The second acylindrical lens 1214 is similar to the first acylindrical lens 1212 is orthogonally disposed relative to the first acylindrical lens 1212 in order to shape the incident beam intensity profile along the Y-axis.

The embodiments of the invention described above are intended to be exemplary only. The scope of the invention is therefore intended to be limited solely by the scope of the appended claims.

What is claimed is:

1. A beam shaping system for providing a shaped beam substantially rectangular and having a controlled intensity profile in a far field region, from an incident beam having a predetermined intensity profile along a first and a second axis, said beam shaping system comprising:
   a first and a second acylindrical lens each having a primary acylindrical surface with a base curve, said first and said second acylindrical lenses being disposed substantially orthogonally to one another, said first acylindrical lens for shaping said incident beam along said first axis and said second acylindrical lens for shaping said incident beam along said second axis, thereby providing said substantially rectangular shaped beam;
   wherein said base curve of said first lens fits a first equation in a Cartesian coordinate system (x,y), said first equation being $$y = \frac{c_1 x^2}{1 + (1-(1+Q_1)c_1^2 x^2)^{1/2}} + f_1(x),$$

$c_1$ being a first curvature constant, $Q_1$ being a first conic constant and $f_1(x)$ being a first correction function, said first correction function being continuous; and
   wherein said base curve of said second lens fits a second equation in another Cartesian coordinate system (x,y), said second equation being $$y = \frac{c_2 x^2}{1 + (1-(1+Q_2)c_2^2 x^2)^{1/2}} + f_2(x),$$

$c_2$ being a second curvature constant and $Q_2$ being a second conic constant and $f_2(x)$ being a second correction function, said second correction function being continuous.

2. The beam shaping system as claimed in claim 1, wherein a magnitude of the absolute value of the product $Q_1 \cdot c_1$ and a magnitude of the absolute value of the product $Q_2 \cdot c_2$ lie between 0.25 and 1000 mm$^{-1}$ and wherein $Q_1$ and $Q_2$ are less than −1.

3. The beam shaping system as claimed in claim 1, wherein said first acylindrical lens and said second acylindrical lens each comprise a secondary surface, each of said secondary surface being one of a planar surface and a cylindrical surface.

4. The beam shaping system as claimed in claim 1, wherein said first and said second acylindrical lenses are positive lenses.

5. The beam shaping system as claimed in claim 1, wherein an input surface of said first and said second acylindrical lenses is said primary surface.

6. The beam shaping system as claimed in claim 1, further comprising collimating lens means for collimating said shaped beam.

7. The beam shaping system as claimed in claim 6, wherein said collimating lens means comprise a first cylindrical collimating lens for collimating said shaped beam along said first axis and a second cylindrical collimating lens for collimating said shaped beam along said second axis in order to eliminate an astigmatism caused by a distance between said first and said second acylindrical lenses.

8. The beam shaping system as claimed in claim 6, wherein said first acylindrical lens has a first point source and said second acylindrical lens has a second point source and wherein said collimating lens means comprise a first cylindrical collimating lens for collimating said shaped beam along said first axis and a second cylindrical collimating lens for collimating said shaped beam along said second axis, said a first cylindrical collimating lens having a first focal length and being located at one first focal length distance from said first point source and said second cylindrical collimating lens having a second focal length and being located at one second focal length distance from said second point source.

9. The beam shaping system as claimed in claim 1, further comprising focusing lens means for focusing said shaped beam, said focusing lens means comprising a positive lens device.

10. The beam shaping system as claimed in claim 9, wherein said focusing lens means further comprise a negative lens device positioned between said second acylindrical lens, said negative lens device for providing a retro-focus focusing lens system.

11. The beam shaping system as claimed in claim 9, wherein said focusing lens means comprise a first cylindrical focusing lens for focusing said shaped beam along said first axis and a second cylindrical focusing lens for focusing said shaped beam along said second axis in order to eliminate an astigmatism of said shaped beam.

12. The beam shaping system as claimed in claim 1, wherein said incident beam has astigmatism.

13. The beam shaping system as claimed in claim 1, wherein said incident beam is a substantially collimated and rotationally symmetrical Gaussian beam.

14. The beam shaping system as claimed in claim 1, wherein said incident beam is non-rotationally symmetrical.

15. The beam shaping system as claimed in claim 1, wherein said shaped beam has at least one of a cosine corrected, a super-gaussian and a uniform intensity profile along each one of said first and said second axes, in a far field region.

16. The beam shaping system as claimed in claim 1, further comprising beam splitting means for producing a pattern of a plurality of substantially rectangular beams.

17. The beam shaping system as claimed in claim 16, wherein said beam splitting means comprises a diffractive beam splitter.

18. A rectangular beam light source for providing a substantially rectangular shaped beam having a controlled intensity profile, said rectangular beam light source comprising:
   an incident light source for providing an incident beam having a predetermined cross-sectional intensity profile along a first axis and a second axis; and
   a first and a second acylindrical lens each having a primary acylindrical surface with a base curve, said first and said second acylindrical lenses being disposed substantially orthogonally to one another, said first acylindrical lens for shaping said incident beam along said first axis and said second acylindrical lens for shaping said incident beam along said second axis, thereby providing said substantially rectangular shaped beam;

wherein said base curve of said first lens fits a first equation in a Cartesian coordinate system (x,y), said first equation being $$y = \frac{c_1 x^2}{1 + (1 - (1+Q_1)c_1^2 x^2)^{1/2}} + f_1(x),$$

$c_1$ being a first curvature constant, $Q_1$ being a first conic constant and $f_1(x)$ being a first correction function, said first correction function being continuous; and wherein said base curve of said second lens fits a second equation in another Cartesian coordinate system (x,y), said second equation being $$y = \frac{c_2 x^2}{1 + (1 - (1+Q_2)c_2^2 x^2)^{1/2}} + f_2(x),$$

$c_2$ being a second curvature constant and $Q_2$ being a second conic constant and $f_2(x)$ being a second correction function, said second correction function being continuous.

19. The rectangular beam light source as claimed in claim 18, wherein a magnitude of the absolute value of the product $Q_1 \cdot c_1$ and a magnitude of the absolute value of the product $Q_2 \cdot c_2$ lie between 0.25 and 1000 mm$^{-1}$ and wherein $Q_1$ and $Q_2$ are less than –1.

20. The rectangular beam light source as claimed in claim 18, wherein said first acylindrical lens and second acylindrical lens each comprise a secondary surface, each of said secondary surface being one of a planar surface and a cylindrical surface.

21. The rectangular beam light source as claimed in claim 18, further comprising collimating lens means for collimating said shaped beam.

22. The rectangular beam light source as claimed in claim 18, further comprising focusing lens means for focusing said shaped beam, said focusing lens means comprising a positive lens device.

23. The rectangular beam light source as claimed in claim 22, wherein said focusing lens means further comprise a negative lens device positioned between said second acylindrical lens, said negative lens device for providing a retro-focus focusing lens system.

24. The rectangular beam light source as claimed in claim 18, wherein said shaped beam has at least one of a cosine corrected, a super-gaussian and a uniform intensity profile along each one of said first and said second axes, in a far field region.

25. A beam shaping system for providing a substantially rectangular beam having a controlled intensity profile from an incident beam having a predetermined intensity profile along a first axis and a second axis, said beam shaping system comprising:

a first and a second acylindrical lens each having a primary acylindrical surface having a base curve substantially in the shape of an angle with a rounded apex, said first lens for shaping said incident beam along said first axis and said second lens for shaping said incident beam along said second axis;

wherein said first and said second acylindrical lenses are disposed substantially orthogonally to one another, thereby providing said substantially rectangular shaped beam in a far field region.

26. The beam shaping system as claimed in claim 25, wherein said first acylindrical lens and said second acylindrical lens each comprise a secondary surface, each of said secondary surface being one of a planar surface and a cylindrical surface.

27. The beam shaping system as claimed in claim 25, further comprising collimating lens means for collimating said shaped beam.

28. The beam shaping system as claimed in claim 25, further comprising focusing lens means for focusing said shaped beam, said focusing lens means comprising a positive lens device.

29. The beam shaping system as claimed in claim 28, wherein said focusing lens means further comprise a negative lens device positioned between said second acylindrical lens, said negative lens device for providing a retro-focus focusing lens system.

30. The beam shaping system as claimed in claim 25, wherein said shaped beam has at least one of a cosine corrected, a super-gaussian and a uniform intensity profile along each one of said first and said second axes, in a far field region.

31. A beam shaping system for providing a substantially rectangular beam having a controlled intensity profile from an incident beam having a predetermined intensity profile along a first axis and a second axis, said beam shaping system comprising:

a first and a second lens each having a primary acylindrical surface having a base curve with a radius of curvature that varies along said base curve, said radius of curvature being smaller in a center of said base curve and increasing smoothly towards both of extremities of said base curve;

wherein said first lens and said second lens are disposed orthogonally to one another, said first lens for shaping said incident beam along said first axis and said second lens for shaping said incident beam along said second axis, thereby providing said substantially rectangular beam in a far field region.

32. The beam shaping system as claimed in claim 31, wherein said first acylindrical lens and said second acylindrical lens each comprise a secondary surface, each of said secondary surface being one of a planar surface and a cylindrical surface.

33. The beam shaping system as claimed in claim 31, further comprising collimating lens means for collimating said shaped beam.

34. The beam shaping system as claimed in claim 31, further comprising focusing lens means for focusing said shaped beam, said focusing lens means comprising a positive lens device.

35. The beam shaping system as claimed in claim 34, wherein said focusing lens means further comprise a negative lens device positioned between said second acylindrical lens, said negative lens device for providing a retro-focus focusing lens system.

36. The beam shaping system as claimed in claim 31, wherein said shaped beam has at least one of a cosine corrected, a super-gaussian and a uniform intensity profile along each one of said first and said second axes, in a far field region.

* * * * *